Aug. 26, 1958

R. K. POTTLE 2,849,098

STRIP HOLDING AND RELEASING DEVICE

Filed July 23, 1954

INVENTOR.
RALPH K. POTTLE
BY
ATTORNEYS

Aug. 26, 1958
R. K. POTTLE
2,849,098
STRIP HOLDING AND RELEASING DEVICE
Filed July 23, 1954
4 Sheets-Sheet 2
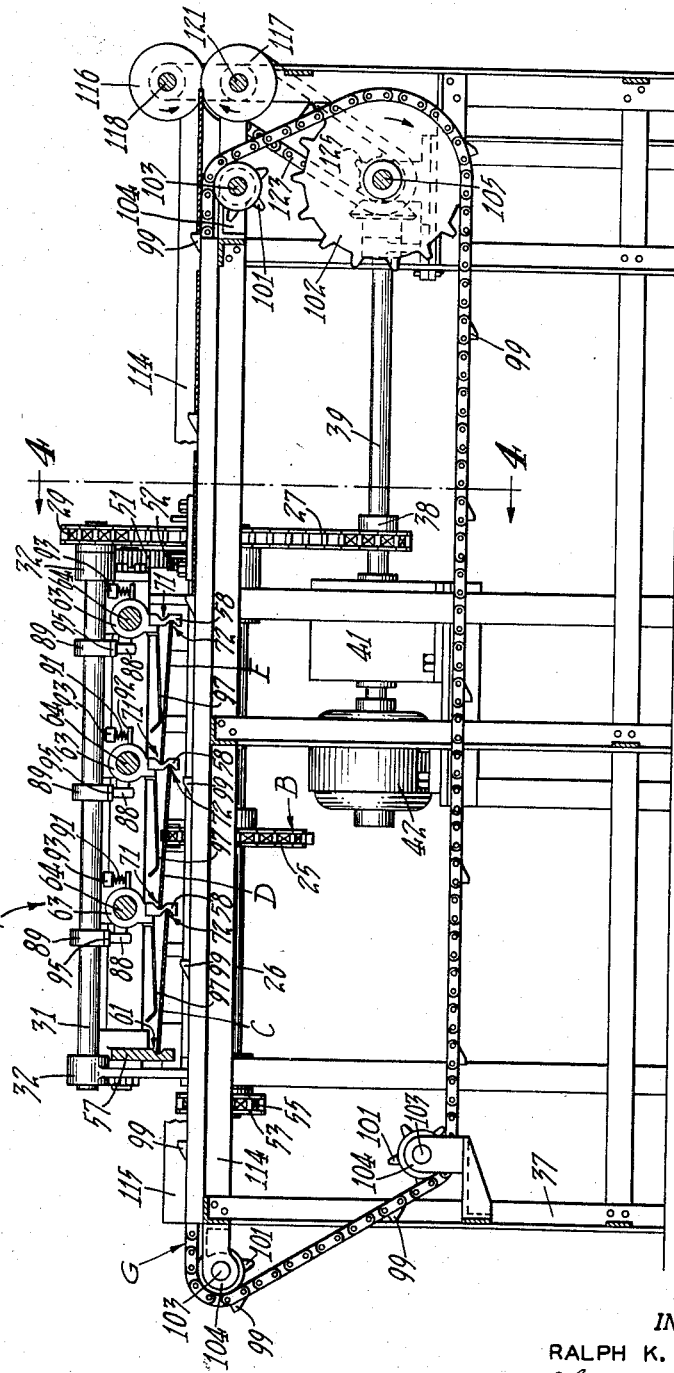
INVENTOR.
RALPH K. POTTLE
BY
ATTORNEYS

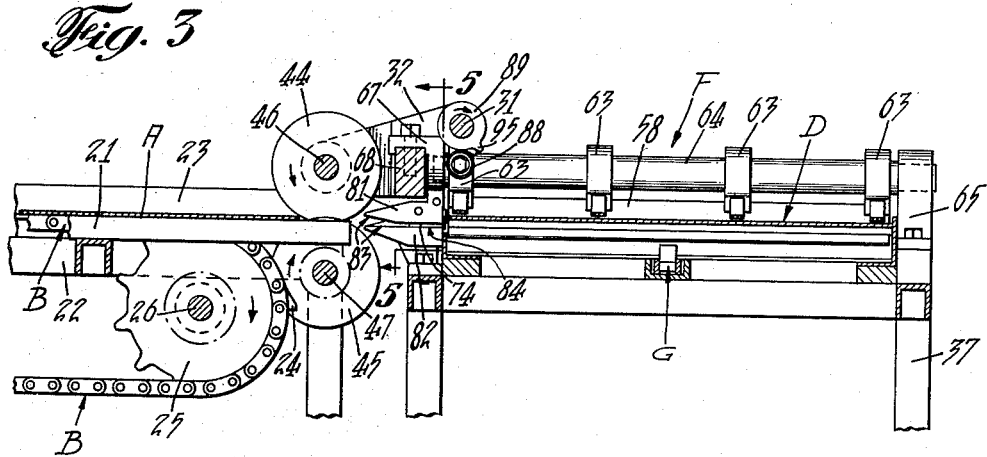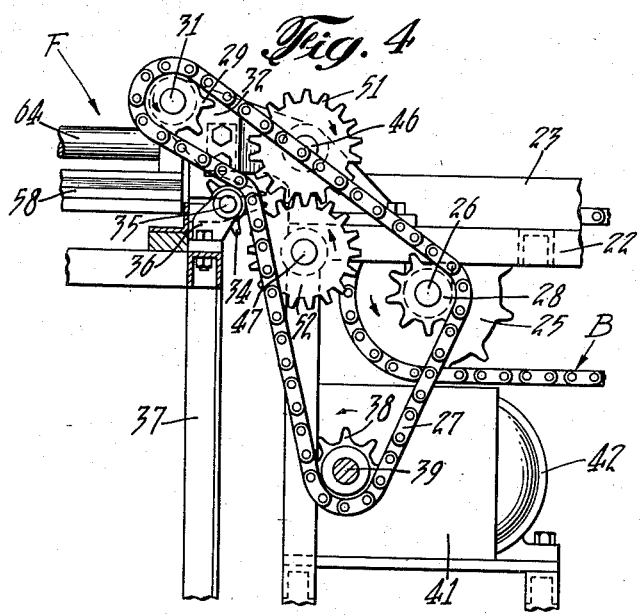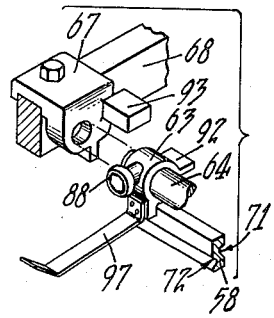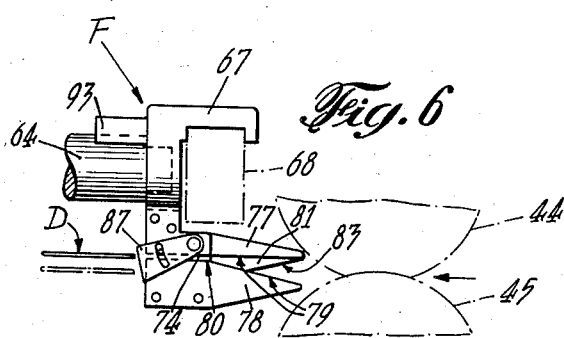

Aug. 26, 1958

R. K. POTTLE 2,849,098

STRIP HOLDING AND RELEASING DEVICE

Filed July 23, 1954

INVENTOR.
RALPH K. POTTLE
BY
ATTORNEYS

United States Patent Office 2,849,098
Patented Aug. 26, 1958

2,849,098
STRIP HOLDING AND RELEASING DEVICE

Ralph K. Pottle, Georgetown, Conn., assignor to American Can Company, New York, N. Y., a corporation of New Jersey Application July 23, 1954, Serial No. 445,283

8 Claims. (Cl. 198—32)

The present invention relates to machines for feeding and slitting or cutting sheets or blanks and has particular reference to devices for receiving the cut sheets or blanks and for releasing them in timed spaced relation for further advancement.

In the manufacture of cans or containers, sheet material, such as tin plate for metallic containers and fibre material for fibre containers, is cut into strips or blanks to be subsequently formed into container bodies or other container parts. Cutting of such material into strips or blanks preferably is effected by slitting rollers which merely slit the material without leaving any space between adjacent blanks. Where further feeding of the severed blanks by engagement with their newly cut edges is contemplated, difficulty is sometimes encountered because of the lack of space between the blanks.

In the instant invention, adjacent or conterminous edges of the cut blanks are shifted vertically, one edge being elevated and the other being depressed for engagement by mechanically operated devices which can be readily operated to release the blanks in succession so as to space and time them for further advancement.

An object of the instant invention is the provision in a sheet slitting machine of a mechanically operated holding and releasing device for receiving the blanks resulting from the slitting operation and for releasing them in spaced and timed order for further advancement, to overcome certain failings in electrical and magnetic devices of a similar character.

Numerous other objects and advantages of the invention will be apparent as it is better understood from the following description, which, taken in connection with the accompanying drawings, discloses a preferred embodiment thereof.

Referring to the drawings:

Fig. 2 is a sectional view taken substantially along the line 2—2 in Fig. 1;

Figure 1:
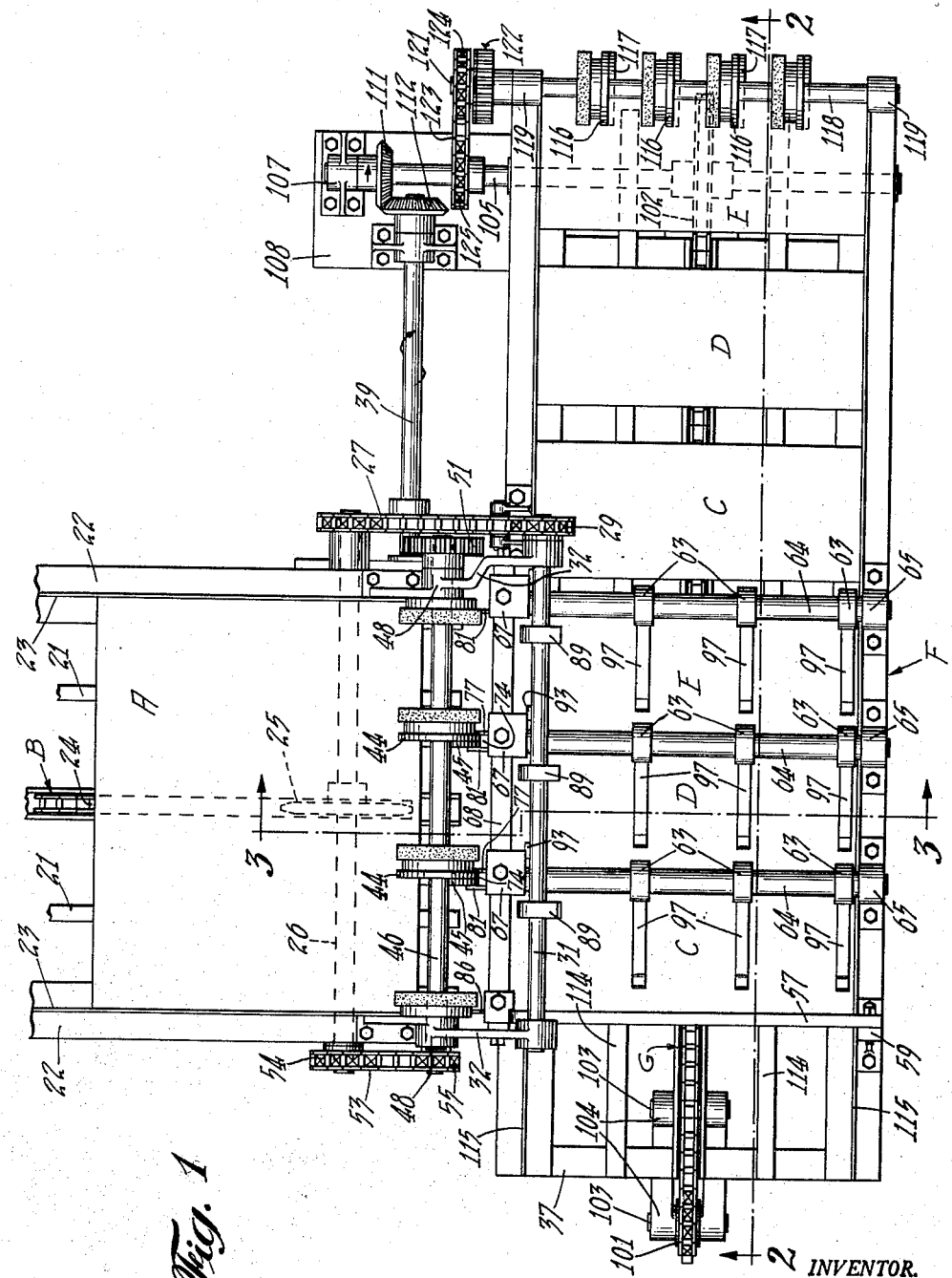
Figure 1 is a top plan view of a slitting machine embodying the instant invention, with parts broken away.
Figure 8:
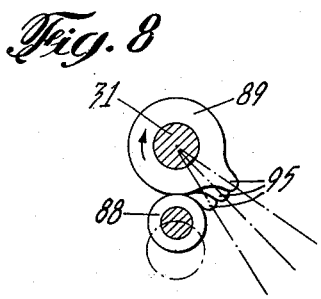

Figs. 3 and 4 are enlarged fragmentary sectional views taken substantially along the lines 3—3, 4—4 in Figs. 1 and 2 respectively;

Fig. 5 is an enlarged fragmentary sectional view taken substantially along the broken line 5—5 in Fig. 3;

Fig. 6 is a fragmentary elevational view taken substantially along a plane indicated by the line 6—6 in Fig. 5;

Fig. 7 is a fragmentary perspective view of certain of the parts in Fig. 5 and parts thereadjacent in exploded relation;

Fig. 8 is an enlarged sectional view of a cam detail shown in Fig. 3; and

Figs. 9, 10, 11 and 12 are enlarged schematic views showing various stages in receiving and releasing in proper sequence, slit blanks to be further advanced after the slitting operation.

As a preferred or exemplary embodiment of the instant invention the drawings illustrate the principal parts of a tandem slitting machine of the type disclosed in United States Patent 2,355,079 issued August 8, 1944 to L. L. Jones on Sheet Slitting Machine. In such a machine large primary metal sheets A, preferably as received from the mill (Fig. 1), of substantially rectangular configuration are conveyed longitudinally of the machine by a primary conveyor B and are trimmed and initially cut or slit into a plurality of smaller strips or blanks. The drawings show three such strips C, D, E although the primary sheets A may be cut into any number of smaller strips depending upon the width desired.

The strips C, D, E as initially cut, with substantially no spaces between their cut edges, are received in a releasing device F which temporarily locates and holds the strips and then releases them in succession so that they fall in timed and spaced order onto an auxiliary conveyor G located preferably at right angles to the path of travel of the primary sheets A. The auxiliary conveyor G advances the strips C, D, E in timed and spaced relation for transversely cutting into smaller portions preferably to produce individual can body blanks or other container parts.

The primary sheets A enter the machine preferably in processional and timed order on the conveyor B from any suitable source of supply and are supported in a substantially horizontal position on support rails 21 (Figs. 1 and 3) carried in a frame 22 which is part of the main frame of the machine. Side guides 23 supported on the frame 22 guide the sheets A.

The conveyor B preferably is an endless chain provided with spaced feed dogs 24 for engaging behind the primary sheets A and for advancing them, as shown in the above mentioned Jones Patent 2,355,079. The conveyor preferably is operated continuously by a sprocket 25 (Figs. 1 and 3) which is mounted on a sprocket shaft 26 journaled in bearings formed in the machine frame 22. The sprocket shaft 26 is rotated by an endless chain 27 (see also Fig. 4) which operates over four sprockets, a sprocket 28 secured to one end of the sprocket shaft 26, a sprocket 29 on a cam shaft 31 journaled in bearing brackets 32 attached to the frame 22, an idler sprocket 34 mounted on a short shaft 35 in a bearing bracket 36 attached to an auxiliary frame 37 disposed adjacent the frame 22, and a driving sprocket 38 on a drive shaft 39 of a conventional gear reduction unit 41 attached to the frame 22 and continuously operated by an electric motor 42 (see also Fig. 2). The shaft 39 constitutes the main drive shaft of the machine.

The conveyor B advances the primary sheets A into the grip of cooperating upper and lower slitting rollers 44, 45 (Figs. 1 and 3). These rollers 44, 45 are mounted on and rotated with, spaced and parallel upper and lower slitter shafts 46, 47 which extend across the path of travel of the primary sheets A and which are journaled in bearings 48 formed in the brackets 32 attached to the frame 22. The two slitter shafts 46, 47 are rotated in unison through meshing gears 51, 52 mounted respectively on the outer ends of the shafts. The lower slitter shaft 47 is driven from the sprocket shaft 26 through an endless chain 53 (Fig. 1) which operates over sprockets 54, 55 mounted respectively on the sprocket shaft 26 and the lower slitter shaft 47.

As the primary sheets A are fed into the grip of the slitting rollers 44, 45, the rollers continue the advancement of the sheets and feed them through and simultaneously slit the sheets along longitudinal lines of severance to produce the strips C, D, E. Since the severing of the sheets into strips is a slitting operation, no spaces are produced between the strips along the lines of severance while the strips C, D, E are being cut. As their cut portions leave the slitting rollers and advance toward the releasing device F, the newly slit edges of the strips are in substantially abutting relation.

The releasing device F is disposed immediately adjacent the slitter rollers 44, 45 and preferably comprises a stationary notched support bar or element 57 and a plurality of notched movable support bars or elements 58 all of which extend out over the auxiliary conveyor G and which are disposed in endwise alignment with the severed edges of the strips C, D, E being cut from the sheets A, including the outer edges of the sheets A or the trimmed edges if the sheets are trimmed. The support bar 57 (at the left as viewed in Figs. 1 and 2) is aligned with the outer or trimmed edge of the sheets A and is secured at one end to the adjacent bracket 32 and at its other end to a bracket 59 (Fig. 1) attached to the auxiliary frame 37. The inner face of this support bar 57 is formed with a longitudinal groove or notch 61 (Figs. 2 and 9) having tapered sides for the reception of the outer or trimmed edge of a strip C cut from a sheet A.

The movable support bars 58 are secured to longitudinally spaced bearing blocks 63 (Figs. 1, 2, 3, 7 and 9) which are carried on shafts 64 disposed above and in parallelism with the support bars. The outer ends of the shafts 64 are pivoted for rocking movement in bearings 65 secured to the auxiliary frame 37. The inner ends of the shafts 64 are similarly pivoted in bearings 67 (Figs. 1, 3, 5, 6 and 7) carried on a cross rod 68 which extends across the frame 22 in front of the slitter rollers 44, 45 and at its ends is secured to the two brackets 32.

Each of the support bars 58 in their sides faces (at the right in Figs. 2 and 9) remote from the notched face of the stationary support bar 57 is provided with a longitudinal notch 71 (see Figs. 2, 7 and 9) having tapered sides or ledges which is similar to the notch 61 in the bar 57 and which is disposed at the same level or elevation as the notch 61. In a similar manner, the opposite faces (at the left in Figs. 2 and 9) of the support bars 58, i. e. the faces which face the notched face of the support bar 57, are provided with longitudinal notches 72 having tapered sides or ledges which are disposed at a lower level or elevation than the notch 61 in the stationary support bar 57. This difference in level or elevation of the notches 71, 72 in each movable support bar 58 gives the bar an S-shape as viewed in Figs. 2 and 9. These notches 71, 72 in the support bars 58 are to receive the severed edges of the strips C, D, E.

The severed edges of the strips C, D, E are directed into the notches 71, 72 by short stationary support sections 74 (Figs. 3, 5, and 6) which are similar to the support bars 58 and which form disconnected continuations of the bars 58. These sections 74 are provided with grooves or notches 75, 76 (Fig. 5) which align with the notches 71, 72 in the bars 58. The sections 74 are secured to and depend from the bearings 67.

Adjacent the notches 75, 76, the short support sections 74 are provided with stationary guide plates which are secured to the sides of the sections and which extend toward and into close proximity to the slitting rollers 44, 45. Adjacent the groove 75, the section 74 is fitted with a straight edged upper guide plate 77 (Figs. 5 and 6) and a tapered edge lower guide plate 78 forming a wide tapered open mouth 79 adjacent the slitting rollers and a continuing narrow gap 80 directly opposite the notch 75.

On the opposite side of the support section 74, adjacent the notch 76, the section 74 carries a tapered edge upper guide plate 81 (see Fig. 3) and a straight edged lower guide plate 82 forming a wide tapered open mouth 83 adjacent the slitting rollers 44, 45 and a continuing narrow gap 84 directly opposite the notch 76.

As the strips C, D, E are slit from the primary sheets A, the strips advance directly toward the open mouths 79, 83 formed by the guide plates 77, 78, 81, 82 and travel along the straight and tapered edges of the plates and thus guide or direct one severed edge (at the right as viewed in Fig. 2) of each strip above the feed line and into the notches 75 of the stationary support sections 74 and the other severed edge (at the left in Fig. 2) of each strip below the feed line and into the notches 76 of the support sections 74. The severed or trimmed edge (at the left in Fig. 2) of the strip C enters directly into the notch 61 of the stationary support bar 57 by way of similar guide plates 86 (Fig. 1) attached to the bar 57. In a similar manner only one set of guide plates 81, 82 is required adjacent the severed or trimmed edge (at the right in Figs. 1 and 2) to guide this edge into its notch 76 of the stationary support section 74 disposed adjacent this edge.

The guiding of the opposed edges of each strip C, D, E, into the notches 75, 76 of the stationary support sections 74 separates the previously abutting edges vertically and results in a slight tilting of the strips transversely into angular positions as best shown in Fig. 2. This action also aligns the edges with the continuing notches 71, 72 of the movable support bars 58 so that the strips as they advance during the slitting operation move directly into the notches 71, 72 where they are temporarily held in suspended relation over the auxiliary conveyor G as best shown in Fig. 2. A latch 87 (Figs. 5 and 6) pivotally carried on the side of the stationary bearing 67 overlaps the gaps 80 and is pushed aside as a strip passes and falls down behind the strip to hold it in its support bars 58.

Upon completion of the slitting operation and when the strips C, D, E are fully supported in the notches 71, 72 of the support bars 58 and notch 61 in the stationary support bar 57, they are released in succession and in timed order by mechanical manipulation of the movable support bars 58, to drop vertically onto the auxiliary conveyor G for further advancement. This mechanical manipulation of the movable support bars is effected by cam action. For this purpose, the innermost bearing blocks 63 on each rocker shaft 64 to which the support bars 58 are attached, carries a cam roller 88 (Figs. 2, 3, 7 and 9) which rides against an edge cam 89 mounted on and rotating with the cam shaft 31. There is one cam 89 for each movable support bar 58. Compression springs 91 interposed between a lug 92 on the bearing blocks 63 and a lug 93 on the adjacent stationary bearings 67 hold the cam rollers 88 against the edge cams 89.

Each edge cam 89 is formed with a high spot or actuating lug 95 (see Fig. 8) for depressing the cam rollers 88 at the proper time to rock the rocker shafts 64 and the movable support bars 58 attached thereto. These cam lugs 95 are located in circumferentially spaced relation, preferably about twelve degrees apart, as shown in Fig. 8 for operation of the movable support bars 58 in timed sequence.

Figure 9:
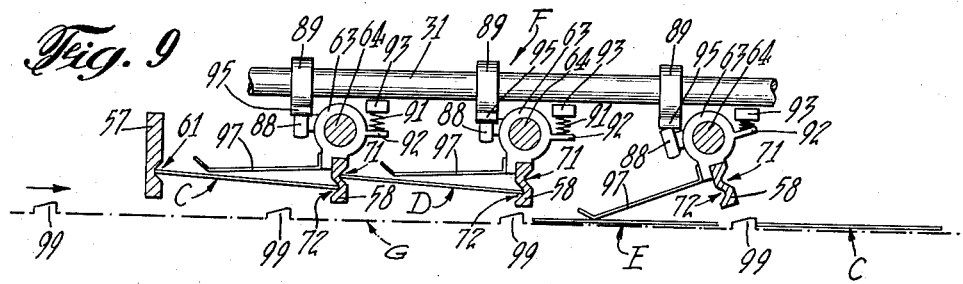

In operation, the cam lug 95 at the extreme right as viewed in Fig. 2, and lowermost as viewed in Fig. 8, engages its cam roller 88 first and rocks the associated support bar 58 counterclockwise as best shown in Fig. 9. This action shifts the support bar 58 away from the next adjacent support bar 58 (at the left in Fig. 9) and thus withdraws its support from the strip E. A plurality of yieldable pressure fingers 97 attached to each of the bearing blocks 63 press against the strip E during rocking movement of the support bar 58 and thus force the strip E out of its tapered sided notch 71 in the adjacent support bar 58 (at the left in Fig. 2) and press the strip down against the auxiliary conveyor G for further advancement.

Figure 10:
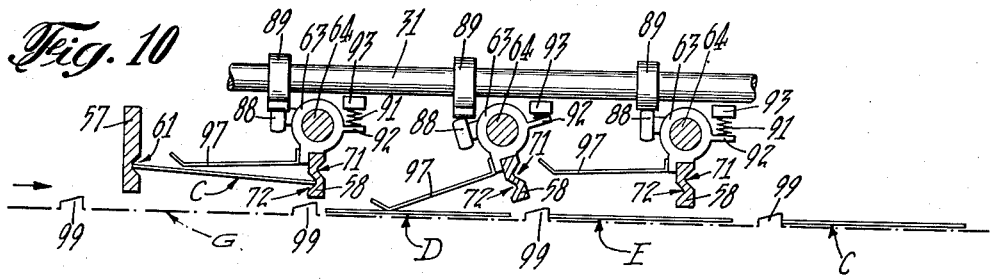
Figure 11:
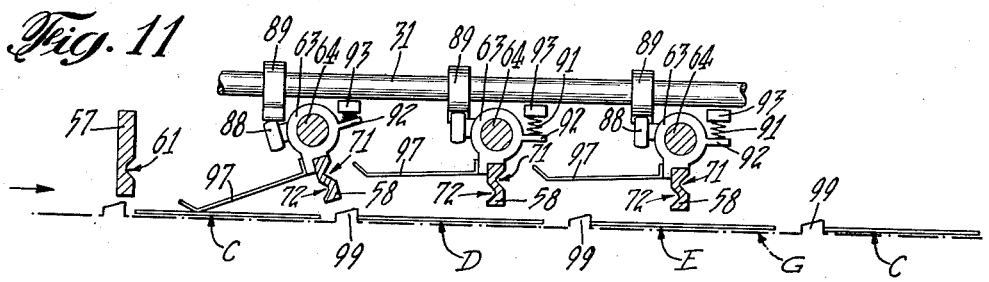
Figure 12:
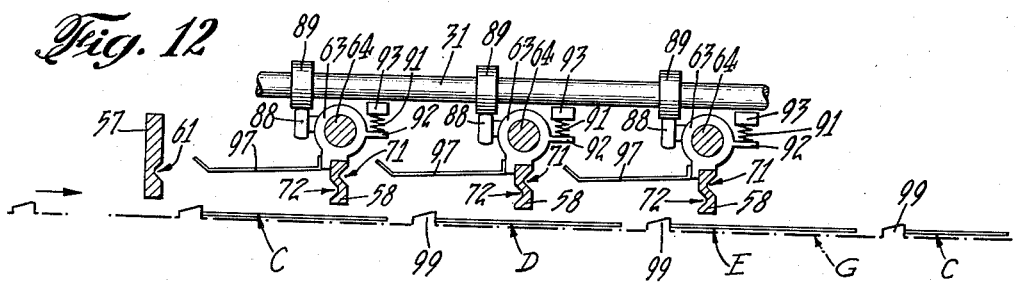

This same operation is repeated for each of the movable support bars 58 as shown in Figs. 10, 11, and 12 to release their strips D, C, to the auxiliary conveyor G, the strips being released in rapid succession and as soon as a preceding strip is clear of its supporting bars. As soon as a strip is released and delivered to the auxiliary conveyor G, its movable support bar 58 is returned to its original position in alignment with the short guide sections 74 for a repeat operation on the next primary sheet A.

The strips E, D, C as they are delivered to the auxiliary conveyor G in that order are received on the auxiliary conveyor G in timed relation to and in front of spaced feed dogs 99 (Fig. 2) carried on the conveyor. This conveyor G preferably is an endless chain which operates over a set of three spaced idler sprockets 101 (Figs. 1 and 2) and a driving sprocket 102. The idler sprockets 101 are mounted on short shafts 103 journaled in bearings 104 in the frame 37. The driving sprocket 102 is mounted on a transverse drive shaft 105 which is journaled in bearings 106 formed in the frame 37 and in a bearing bracket 107 secured to an extension 108 of the frame 37. The shaft 105 is driven by a bevel gear 111 which is carried on the shaft and which meshes with and is driven by a bevel gear 112 on the main shaft 39 (Fig. 1).

The upper run of the auxiliary conveyor G receives the strips C, D, E, and conveys them along spaced and parallel support rails 114 and guide rails 115 on the frame 37. As hereinbefore mentioned, the purpose of separating the strips C, D, E and advancing them in spaced and timed order is to perform a subsequent slitting operation upon them individually. For this purpose, the conveyor G advances each strip in timed order into the grip of a set of upper and lower second operation or auxiliary slitting rollers 116, 117 (Figs. 1 and 2). As the strips C, D, E pass between these rollers they are slit transversely into blanks from which can bodies or other container parts are made. The slit blanks are discharged from the rollers to any suitable place of deposit.

The upper second operation slitter rollers 116 are carried on and rotate with a transverse shaft 118 (Figs. 1 and 2), the ends of which are journaled in bearings 119 in the auxiliary frame 37. In a similar manner the lower slitter rollers 117 are carried on and rotate with a transverse shaft 121 which is parallel with the upper shaft 118 and which is journaled in bearings formed in the frame 37. The two shafts 118, 121 are rotated in unison in the proper direction by meshing gears 122 mounted on the outer ends of the shafts as in the Jones patent hereinbefore mentioned. The lower shaft 121 is the drive shaft and is rotated by an endless chain 123 which operates over a sprocket 124 on the shaft 121 and over a driving sprocket 125 on the auxiliary conveyor shaft 105. Thus the slitter rollers 116, 117 are driven in time with the other moving parts of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for feeding and slitting sheet material, the combination of a conveyor, actuating means for advancing said conveyor, a plurality of feed dogs on said conveyor in spaced order, a plurality of spaced and parallel support bars extending transversely over said conveyor, said support bars having opposed faces and having a longitudinal groove in each face for receiving and for supporting opposed edges of strips interposed between adjacent bars, means for feeding said strips of sheet material into position between said support bars with opposed edges of said strips supported by said grooves, and means for moving said support bars in succession relative to each other and in time with the advancement of said feed dogs to release said strips from said grooves in succession to said conveyor for the advancement of said strips by said conveyor in spaced and timed order.

2. In a machine of the character defined in claim 1 in which the longitudinal groove in like faces of said support bars are disposed at the same level and in which the groove in one face of each bar is at a higher level than the groove in the opposite face of each bar so as to hold the strips in a tilted relation with adjacent edges of the strips in vertically separated relation.

3. In a machine for feeding and slitting sheet material, the combination of a conveyor, actuating means for advancing said conveyor, a plurality of feed dogs on said conveyor in spaced order, a plurality of spaced and parallel support bars extending transversely over said conveyor, each of said support bars having opposed longitudinal ledges disposed at different levels for receiving and for supporting opposed edges of strips interposed between adjacent bars, guide means disposed in endwise alignment with support bars and provided with guide elements leading from a common level to the different levels of said ledges for directing opposed edges of said strips to said different levels, means for feeding said strips of sheet material through said guide means and into position between said support bars with opposed edges of said strips supported by adjacent bars, and means for moving said support bars in succession relative to each other and in time with the advancement of said feed dogs to release said strips in succession to said conveyor for the advancement of said strips by said conveyor in spaced and timed order.

4. In a machine of the character defined in claim 3 in which said guide means are short stationary and independent sections of said support bars, said sections having opposed faces, each face having a strip supporting ledge coextensive with the ledges in said support bars and having edged guide plates disposed adjacent each face for guiding the edges of said strip from a common level to the level of the edge supporting ledge.

5. In a machine for feeding and slitting sheet material, the combination of a conveyor, actuating means for advancing said conveyor, a plurality of feed dogs on said conveyor in spaced order, a plurality of spaced and parallel support bars extending transversely over said conveyor for supporting opposed edges of strips interposed between adjacent bars, means for feeding said strips of sheet material into position between said support bars with opposed edges of said strips supported by adjacent bars, latch means at the entrance ends of said support bars for holding said strips in place on said support bars, and means for moving said support bars in succession relative to each other and in time with the advancement of said feed dogs to release said strips in succession to said conveyor for the advancement of said strips by said conveyor in spaced and timed order.

6. In a machine for feeding and slitting sheet material, the combination of a conveyor, actuating means for advancing said conveyor, a plurality of feed dogs on said conveyor in spaced order, a plurality of spaced and parallel support bars extending transversely over said conveyor for supporting opposed edges of strips interposed between adjacent bars, means for feeding said strips of sheet material into position between said support bars with opposed edges of said strips supported by adjacent bars, means for moving said support bars in succession relative to each other and in time with the advancement of said feed dogs to release said strips in succession to said conveyor for the advancement of said strips by said conveyor in spaced and timed order, and a pressure finger carried by and movable with each of said support bars for engagement against said strips for yieldably pressing said released strips into position against said conveyor.

7. In a machine for feeding and slitting sheet material, the combination of a conveyor, actuating means for advancing said conveyor, a plurality of feed dogs on said conveyor in spaced order, a plurality of spaced and parallel support bars extending transversely over said conveyor, said support bars having means for receiving and guiding opposed edges of strips of sheet material interposed between adjacent bars for supporting said strips and for restraining them against lateral displacement, means for feeding said strips of sheet material into position between said support bars with opposed edges of said strips in said guiding means, and means for moving said support bars in succession relative to each other and in time with the advancement of said feed dogs to release said strips from said guiding means in succession to said conveyor for the advancement of said strips by said conveyor in spaced and timed order.

8. A machine of the character defined in claim 7 wherein said support bars also include means for confining said opposed edges of said strips of material against displacement in a direction substantially normal to the faces of said strips.

References Cited in the file of this patent

UNITED STATES PATENTS

| | | |
|---|---|---|
| 1,727,209 | Lentz | Sept. 3, 1929 |
| 2,315,003 | Martin | Mar. 30, 1943 |
| 2,554,095 | Diezel | May 22, 1951 |
| 2,672,931 | Maher | Mar. 23, 1954 |
| 2,775,336 | Rockwell | Dec. 25, 1956 |